No. 758,740. PATENTED MAY 3, 1904.
G. M. DICKSON.
TRACTION ENGINE.
APPLICATION FILED JUNE 4, 1903.
NO MODEL. 3 SHEETS—SHEET 1.
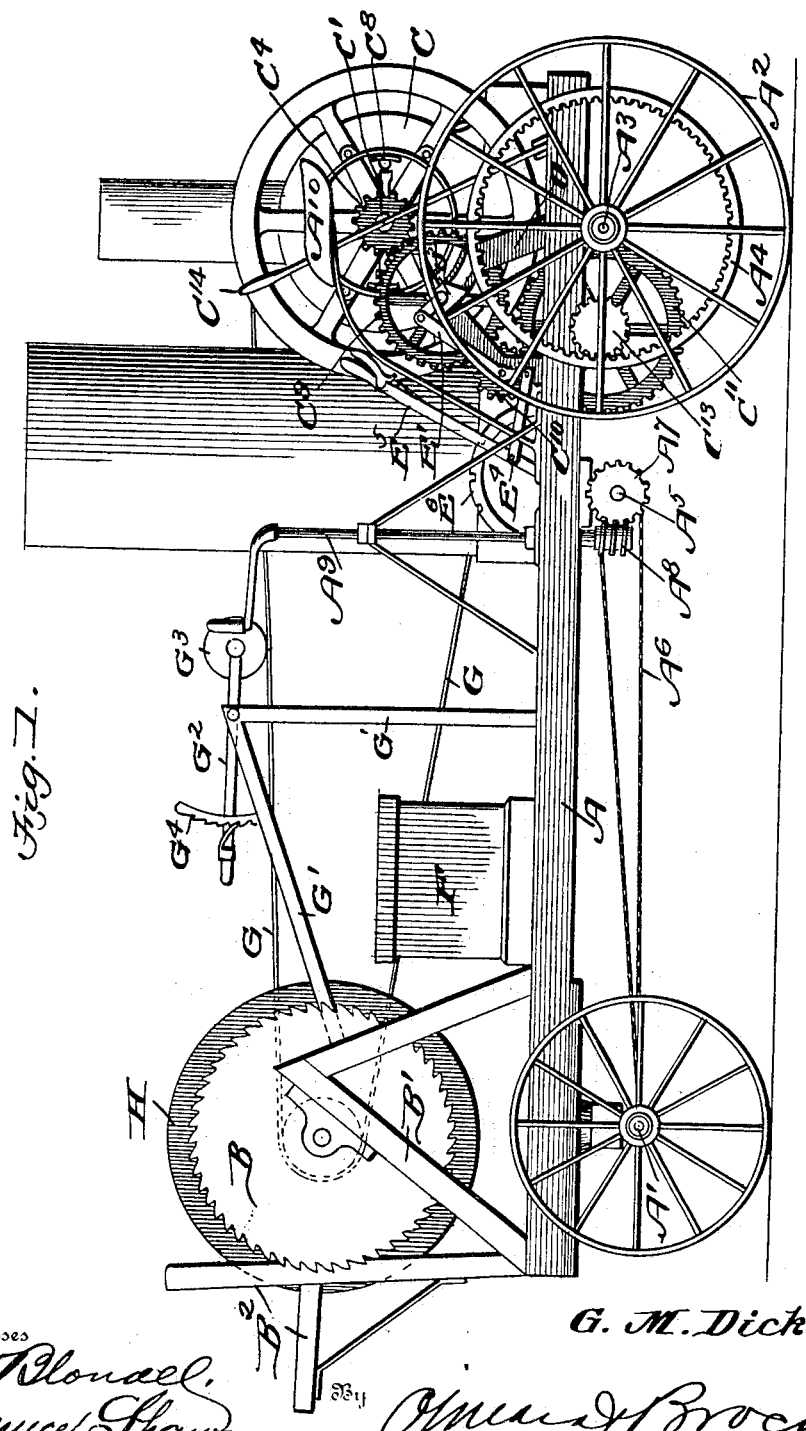
Witnesses
Inventor
G. M. Dickson,
By
Attorneys No. 758,740. PATENTED MAY 3, 1904.
G. M. DICKSON.
TRACTION ENGINE.
APPLICATION FILED JUNE 4, 1903.
NO MODEL. 3 SHEETS—SHEET 2.
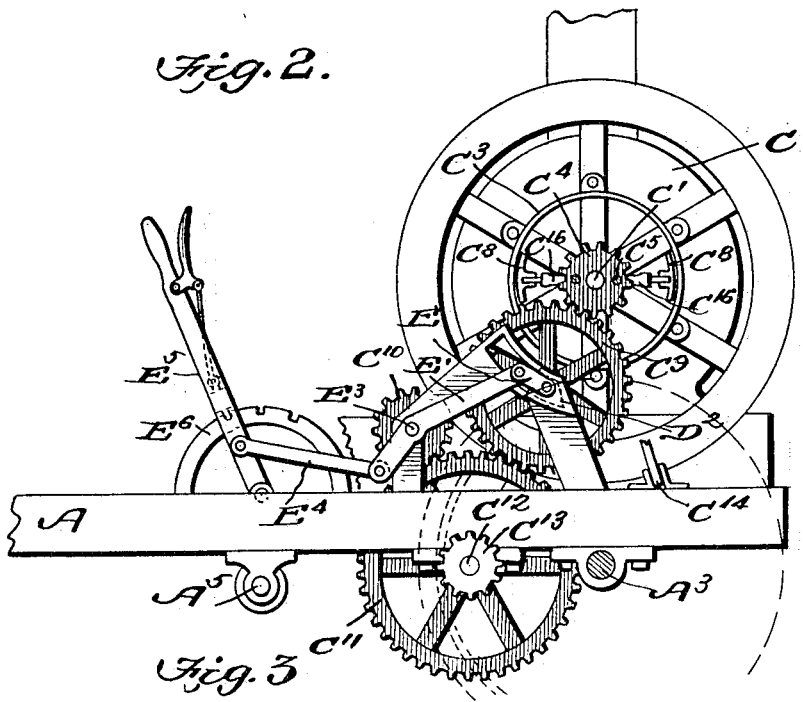
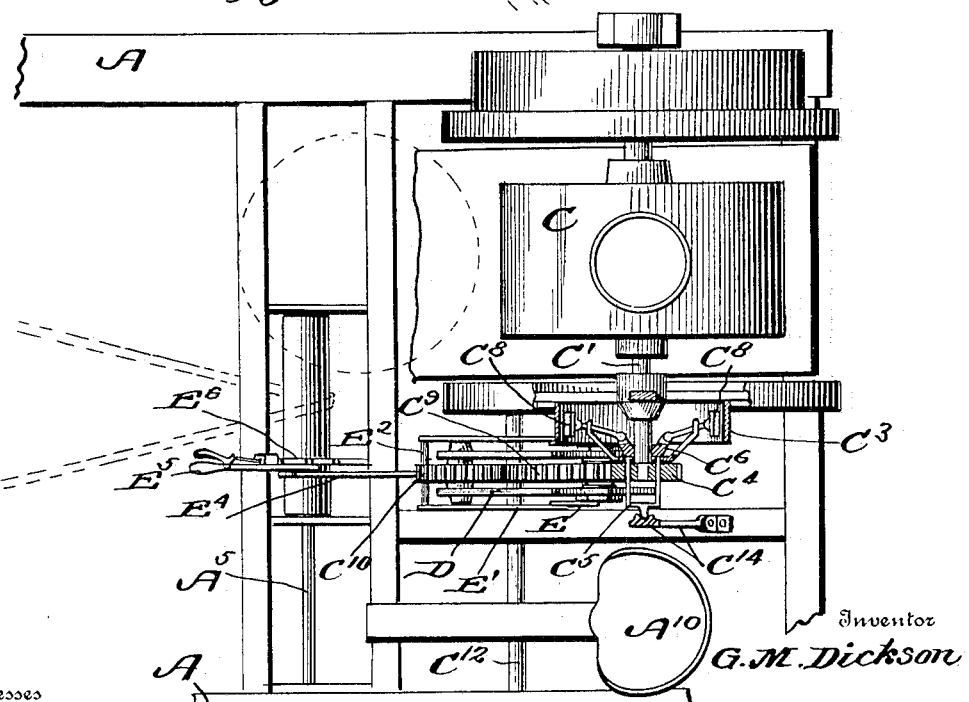

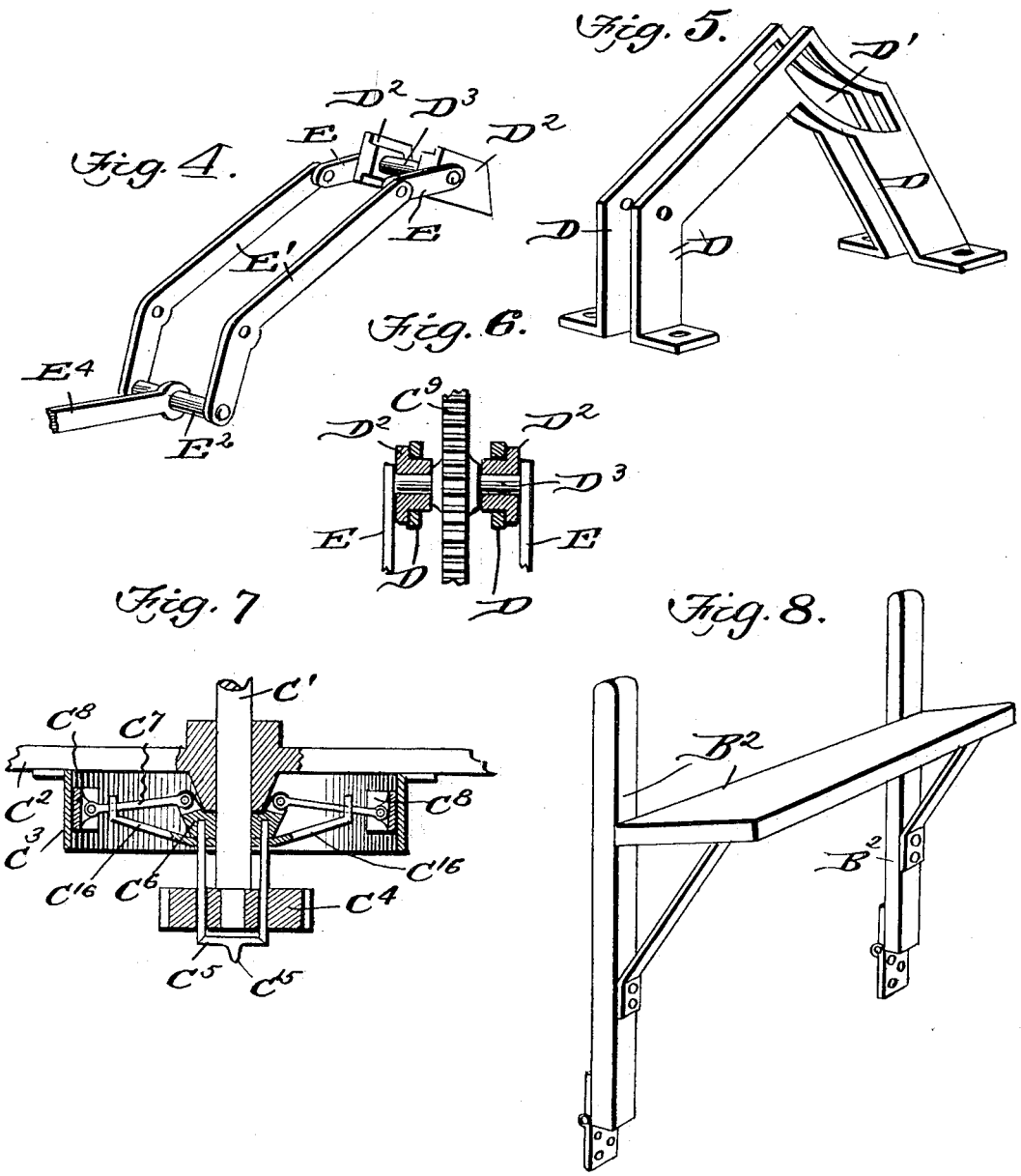

No. 758,740. Patented May 3, 1904.

UNITED STATES PATENT OFFICE.

GEORGE M. DICKSON, OF PALMYRA, MISSOURI.

TRACTION-ENGINE.

SPECIFICATION forming part of Letters Patent No. 758,740, dated May 3, 1904.

Application filed June 4, 1903. Serial No. 160,088. (No model.)

*To all whom it may concern:*

Be it known that I, GEORGE M. DICKSON, a citizen of the United States, residing at Palmyra, in the county of Marion and State of Missouri, have invented a new and useful Traction-Engine Truck, of which the following is a specification.

My invention is an improvement in traction-engine trucks and means for driving the same, including means for reversing the motion of the truck. It is common to mount portable engines upon suitable wheeled trucks and to use the power of the engines used for driving machinery of various kinds for propelling the truck from place to place. This class of engines, commonly designated "road" or "traction" engines, is used with all modern threshing machinery and in connection with sawmills, cotton-gins, &c. Usually the motive power is mounted only on the truck and is moved from one mill to the other or, as in case of a thresher, the threshing machinery is mounted on a separate truck from that carrying the portable engine.

One of the objects of my invention is the placing of the machinery—such as a saw, corn-sheller, or the like—on the same truck with the engine, using the motive power of the latter to propel both itself and the mechanism it drives to the place where the work is to be done.

Another object of my invention is to devise means by which the power of the engine is used to drive the truck in either direction, and my invention therefor includes suitable gearing for transmitting power from the shaft of the engine to the wheels of the truck and mean for reversing the direction of the motion imparted to the truck-wheels.

My invention consists of the novel features of construction and combination of parts described hereinafter, particularly pointed out in the claims, and shown in the accompanying drawings, in which—

Figure 1 is a side elevation of my truck, showing the various parts mounted thereon. Fig. 2 is a side elevation of the rear portion of the truck with the engine and gearing in position. Fig. 3 is a plan view of Fig. 2. Fig. 4 is a perspective view of a pivoted bracket which carries one of the gear-wheels. Fig. 5 is perspective view of a stationary bracket in which is journaled a movable gear-wheel. Fig. 6 is a detail section taken through both brackets, the movable gear being shown in elevation. Fig. 7 is a detail sectional view showing the clutch mechanism. Fig. 8 is a perspective view of a hinged bracket carried at the forward end of the truck.

In the drawings, A represents the truck-frame, and A' a forward pivoted axle. One of the rear wheels $A^2$ on the fixed axle $A^3$ carries a spur-gear $A^4$, through which motion is imparted to the truck, as will be hereinafter described.

A shaft $A^5$ is rotatably journaled below the truck-frame intermediate the front and rear wheels. A chain $A^6$ has its ends secured to the axle A' adjacent opposite ends of said axle, the chain passing over the shaft $A^5$. This shaft carries a pinion $A^7$, meshing with a worm-gear $A^8$, the worm-gear being actuated by the vertical shaft $A^9$, which is journaled in the truck-frame and extends above same, having a crank-handle at its upper end within convenient reach of the seat $A^{10}$. This constitutes the steering apparatus, and by turning the handle and rotating the rod $A^9$ the shaft $A^5$ will be rotated, actuating the chain and swinging the axle A' in the desired direction. Upon the forward end of the truck is mounted the machinery intended to be used, which in the drawings is shown as a circular saw B, mounted on a sawbuck B'. A hinged bracket $B^2$ is secured to front of the truck and is adapted to hold the log fed to the saw. It will be understood, of course, that any other machine, such as corn-shellers and straw-cutters, can be placed on the truck in lieu of the saw. Mounted on the rear of the truck is an engine C of any description having a power-shaft C', carrying a wheel $C^2$, upon which is rigidly secured a friction-band $C^3$, and on the outer end of the shaft C' is arranged a pinion $C^4$. A stirrup $C^5$ has its parallel members sliding through and of course rotating with the pinions $C^4$, the inner ends of these members being connected to a sliding collar $C^6$. This collar carries arms $C^7$, pivotally secured to the collar, and these arms have pivoted upon their outer ends the friction-clutches $C^8$.

A bracket consisting of the two parallel plates D is rigidly secured to the truck-frame, and each of these plates has formed in it an upwardly-curved slot D', the edges of said slot being on the line of a curve struck from the center of the pinion $C^4$. A block $D^2$, having exterior flanges, slides in each slot, and a shaft $D^3$ passes loosely through the blocks, extending beyond them, as shown in Fig. 4. A gear-wheel $C^9$ is loosely mounted on the shaft $D^3$ between the blocks, which wheel meshes with the pinion $C^4$ and rotates between the members D of the rigid bracket. Short links E are pivoted to the ends of the shaft $D^3$, and pivoted to these links are longer cranked parallel links E', connected at their lower ends by a bar $E^2$. The links E' are pivoted intermediate their ends at the cranked portion on a stub-shaft $E^3$, the links E E' and bar $E^2$ forming as a whole a pivoted bracket. On the stub-shaft $E^3$ is pivoted a gear-wheel $C^{10}$, which meshes with a large gear-wheel $C^{11}$, mounted rigidly on a rotatable shaft $C^{12}$, which carries at its outer end a pinion $C^{13}$, meshing with the spur-gear $A^4$, previously mentioned.

To the bar $E^2$ is pivoted one end of a link $E^4$, the opposite end of which is pivoted to a lever $E^5$, working on a rack-bar $E^6$ and which is within reach of the seat $A^{10}$. A lever $C^{14}$ is pivoted at its lower end to the truck-frame, swinging transversely with reference to the frame and having a socket intermediate its ends, in which turns the lug $C^{15}$, formed on the stirrup. As previously stated, the engine may be of any kind, and where a gas-engine is used a battery F may be employed to start the engine and produce the initial explosions. A belt G transmits power from the engine to the machinery to be driven. To hold the belt taut, I provide a frame G', on which is pivoted intermediate its ends a lever $G^2$. One end of this lever carries a disk $G^3$, and at the opposite end is arranged a pawl engaging a rack-segment. A fly-wheel H is arranged on the saw-shaft. It will be noted from the above that I have a very complete apparatus for conveying portable machinery from one place to another.

The operation of the parts above described is as follows: The lever $C^{14}$ being thrown inward the stirrup $C^5$ will be also forced inward, carrying with it the collar $C^6$. The arms $C^7$ of the stirrup work through guide-eyes formed on the ends of bracket-arms $C^{16}$, and inward movement of the stirrup forces the clutches $C^7$ into close contact with the friction-band $C^3$. The rotation with the friction-band of the clutches and arms rotates the stirrup, which in turn rotates the pinion $C^4$, which is loosely mounted on the reduced end of the shaft C'. This pinion engages and rotates the gear-wheel $C^9$, which gear-wheel when in the position shown in Fig. 2 meshes with the gear $C^{11}$, which is rigid on the shaft $C^{12}$, the rotation of which rotates the pinion $C^{13}$, which in turn rotates the spur-gear $A^4$, driving the truck forward. To prevent this movement, the lever $E^5$ is moved along the rack-bar to the position shown in Fig. 1, which movement, through the medium of the links E' and E, draw the sliding blocks $D^2$ to the upper end of the slots D', lifting the gear-wheel $C^9$ out of engagement with the gear-wheel $C^{10}$, which gear-wheel $C^{11}$ reverses the direction of rotation of same.

Having thus fully described my invention, what I claim as new, and desire to secure by Letters Patent, is—

1. The combination with a truck having an engine and rotatable engine-shaft thereon, of a wheel rigidly secured to said shaft, a friction-band secured to said wheel, a pinion loosely secured to said shaft, a stirrup having its members passing through said pinion, a sleeve sliding on said shaft and secured to the inner ends of the stirrup members, arms pivotally secured to said sleeve, friction-clutches pivoted to the ends of said arms and adapted to engage the friction-band, means for sliding said sleeve on the shaft, and means whereby rotation of the pinion is imparted to the truck-wheels.

2. The combination with a wheeled truck having a spur-gear on one of said wheels, of an engine having a rotatable shaft, a pinion loosely mounted on said shaft, means for driving said pinion, a bracket comprising parallel, slotted plates, blocks sliding in said slots, a shaft carried by said blocks, means for sliding the blocks along the slots, a gear-wheel carried on said shaft and meshing at all times with the pinion, a stub-shaft, a large gear-wheel rigid thereon meshing with the first-mentioned gear-wheel when the latter is in its lowest position, an idle gear-wheel meshing with the large gear at all times and with the first-mentioned gear when in its highest position, and a pinion rigidly secured to said stub-shaft and meshing with the spur-gear.

3. In a traction-engine, a rotatable engine-shaft, a spoked wheel rigidly secured on said shaft, a friction-band carried by the spokes of the said wheel, a sleeve slidably arranged on the shaft within the band, bracket-arms rigidly secured to the sleeve and having guide-eyes formed at their free ends, arms pivoted to the sleeve and working through the eyes of the bracket-arms, friction-clutches pivoted to the free ends of the pivoted arms and adapted to engage the friction-band, a pinion having apertures formed therein and loosely mounted on the shaft, a stirrup having arms passing loosely through said apertures and secured to the sleeve, a projecting lug extending outward from the stirrup, and a lever having a socket formed therein adapted to receive said lug.

GEORGE M. DICKSON.

Witnesses:
E. M. TIMBERLAKE,
T. B. SULLIVAN.